Sept. 11, 1951  J. E. BIGELOW  2,567,688
DIRECT CURRENT METER DAMPING ARRANGEMENT
Filed May 25, 1949
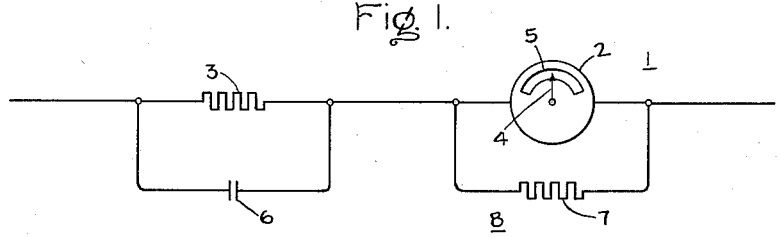
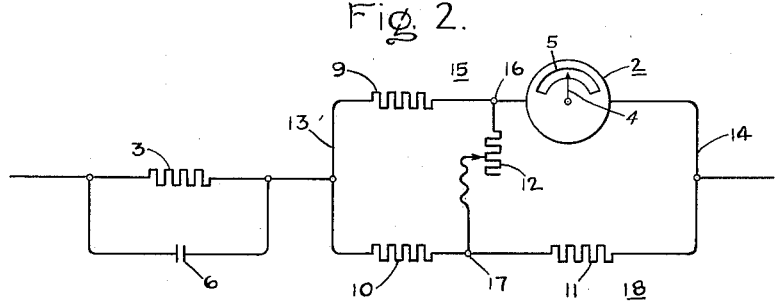
Inventor:
John E. Bigelow,
by *Prowell S Mack*
His Attorney.

Patented Sept. 11, 1951

2,567,688

UNITED STATES PATENT OFFICE 2,567,688

DIRECT-CURRENT METER DAMPING ARRANGEMENT

John E. Bigelow, Schenectady, N. Y., assignor to General Electric Company, a corporation of New York Application May 25, 1949, Serial No. 95,325

2 Claims. (Cl. 171—95)

This invention relates to direct current meters, and more particularly, to an electrical arrangement for adjustably damping direct current meters of the moving-coil galvanometer type or the like.

In the application of a direct current meter for the measurement of voltage in a direct current circuit, the meter is normally connected in series with a resistor, called a multiplier, to calibrate the measuring circuit for the value of voltage to be measured. Also, in the application of a direct current meter to voltage measurements, an indicating needle is moved in response to the value of voltage being measured by the meter to indicate the value thereof on a scale adjacent to the indicating needle. However, in such a conventional circuit, the indicating needle does not immediately move to the correct position with reference to the scale but instead, depending upon the constants of the circuit, the needle may move slowly to the correct position or oscillate about the correct position, or if a capacitor is connected in parallel with the multiplier it may move rapidly to a point beyond the correct position and then return slowly to the correct position, or it may move rapidly to a point short of the correct position and then move slowly to correct position. This characteristic of a direct current voltmeter operating in conventional circuits as described above makes it difficult to quickly obtain an accurate reading of the value of voltage being measured by the instrument.

Therefore, to change the characteristics of the meter to obtain accurate readings more quickly, various damping arrangements have been applied to meters of this type. For example, one conventional arrangement provides magnetic damping of the meter indicating needle by placing a magnet in a position to act upon the needle to impede the motion thereof. Another conventional arrangement provides air damping of the needle by shaping the needle to provide additional resistance to the movement thereof by reason of the air resisting the movement of the needle therethrough.

Each of the above arrangements provides a measure of damping which for many uses of the meter is satisfactory.

However, where the particular use requires adjustment of the damping of the meter, such damping adjustment may be accomplished in a conventional manner by placing an adjustable resistor in parallel with the meter to provide a damping current through the meter and resistor. This method, although satisfactory for damping adjustment, is subject to a disadvantage in that the introduction of the meter resistor changes the calibration of the measuring circuit and therefore a readjustment of impedance in the latter becomes necessary.

It is an object of this invention to provide an electrical arrangement for adjustably damping a direct current meter of the moving-coil galvanometer type without changing the calibration of the measuring circuit of the meter.

It is a further object to provide an electrical arrangement for adjustably damping a direct current meter of the moving-coil galvanometer type with a separate damping circuit which may be adjusted independently of the measuring circuit and which as adjusted to various values has not effect on the calibration of the measuring circuit.

In general, my invention comprises an electrical arrangement incorporating a direct current meter in a bridge type resistance circuit to provide adjustable electrical damping for the meter without affecting the calibration at a measuring circuit of which the meter is a part.

For a complete understanding of my invention, reference should be had to the following specification and the accompanying drawing wherein Fig. 1 is a diagrammatical view of a direct current measuring circuit with a conventional damping arrangement, and Fig. 2 is a diagrammatical view of a direct current measuring circuit showing the application of my invention thereto.

Referring to Fig. 1 of the drawing, I have shown therein a direct current measuring circuit 1 comprising a direct current meter 2 of the moving-coil galvanometer type electrically connected in series with a resistance 3. In order to have meter 2 read correct voltage values for the particular range of voltages of a circuit whose voltage is to be measured by meter 2 resistance 3 is adjusted to calibrate the measuring circuit 1 for the range of voltages to be measured.

The direct current meter 2 has for its voltage indicating means an indicating needle 4 which moves across a calibrated scale 5 adjacent thereto in response to the value of current passing through the meter. In the arrangement as described above, the speed with which the needle 4 moves to a point indicating a true voltage reading is decreased by the resistance of resistor 3 and a rapid indication of true voltage value is prevented.

To increase the speed of response of needle 4 a conventional arrangement may be employed. In this arrangement a capacitor 6 is connected in parallel with the resistance 3, and when voltage is impressed on the measuring circuit 1 a surge of current passes through capacitor 6 and the needle 4 is moved more rapidly in an upscale direction until the energy of the surge is dissipated. In this case, capacitor 6 also becomes a part of the measuring circuit and must be considered in calculating the required predetermined impedance value of the circuit. Thereafter, the indicating needle moves more slowly to its correct position in response to the current passing through resistor 3. That is, the meter 2 initially operates somewhat on a ballistic principle in response to the ampere-seconds supplied by the surge current passing through the capacitor 6 and thereafter on the steady state current passing through the resistor 3. Moreover, those skilled in the art will understand that for any instrument operating on a ballistic principle the constants of the moving system such as inertia, damping, and control spring constant have a direct influence on the movement of the indicating needle. Therefore, when the surge current is fixed by electrically connecting a capacitor of a particular rating in parallel with resistor 3 the characteristic movement of the indicating needle 4 may be varied by changing the mass of the moving parts of meter 2 to change the inertia rating of the same, or by changing the spring constants, or by changing the damping of the meter. For practical reasons the first two are fixed and are not readily adaptable to change.

Therefore, in a conventional arrangement the characteristic movement of the indicating needle is adjusted to cause the needle to move rapidly to its correct indicating position by electrically connecting a resistor 7 in parallel with meter 2, as shown in Fig. 1. The resistor 7 with meter 2 then forms a damping circuit 8.

Those skilled in the art will understand that as the value of resistance in resistor 7 is decreased, its damping effect on meter 2 is increased. Therefore, resistance 7 may be adjusted to provide a desired amount of damping of meter 2. For example, if in measuring a voltage of 50 volts with meter 2 the indicating needle moves rapidly to 40 volts on the scale 5 and thereafter moves slowly upscale to the correct position indicating 50 volts, then, the meter is over damped, and to change the character of movement of the indicating needle the resistor 7 may be adjusted to increase the value thereof and thereby decrease the damping effect and cause the needle to move rapidly to the correct indicating position of 50 volts. Thereafter the current passing through resistance 3 to the meter will hold the indicating needle at the correct indicating position. Thus a rapid accurate reading of the voltage being measured is obtained.

However, in this conventional arrangement the addition of resistance 7, or an adjustment of the same, changes the calibration of the measuring circuit 1 by introducing a circuit in parallel with the meter 2 and compensating changes must be made in the value of resistance 3 and possibly capacitor 6 to maintain the predetermined required impedance of the measuring circuit 1. Thus a multiplicity of adjustments are required.

To provide an arrangement for adjustably damping meter 2 without affecting the voltage measuring circuit and requiring a readjustment of elements in the circuit I provide, in accordance with my invention, an electrical arrangement as illustrated in Fig. 2 wherein 3 resistances 9—11 and an adjustable resistor 12 are substituted for the resistance 7 of Fig. 1. Resistance 9 and meter 2 are electrically interconnected in series between two conductors 13 and 14 and resistance 10 and 11 are also electrically connected in series between conductors 13 and 14, as shown in Fig. 2, thus forming two parallel circuits. Resistance 3 and capacitor 6 are electrically connected in series with the parallel circuits formed by resistor 9 and meter 2 and resistances 10 and 11 to form a direct current measuring circuit 15, as shown in Fig. 2.

To provide a damping circuit for meter 2 adjustable resistor 12 is electrically connected between two points 16 and 17 in the measuring circuit 15, point 16 being electrically positioned between resistor 9 and meter 2 and point 17 being electrically positioned between resistors 10 and 11. As so connected resistance 12 with resistance 11 and meter 2 form an adjustable damping circuit 18 for meter 2.

In order to prevent changes in the adjustment of resistance 12 from affecting the calibration of the measuring circuit 15 the value of resistances 9—11 are selected to make the ratio of resistance of resistor 9 to the internal resistance of meter 2 equal to the ratio of resistance of resistor 10 to resistor 11. With such an arrangement the voltage between points 16 and 17 is zero for all values of current passing through the measuring circuit 15 and therefore, a variation in the value of resistance 12 caused by an adjustment of the same to provide a desired amount of damping of meter 2 has no effect on the calibration of the measuring circuit 15.

Therefore, I have provided an electrical arrangement for adjustably damping a direct current meter of the moving-coil galvanometer type without changing the calibration of the direct current measuring circuit of which the meter is a part.

The resultant advantage of my arrangement is the elimination of additional adjustments of elements of the direct current measuring circuit required in a conventional direct current measuring circuit to produce the same result.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, a pair of resistors of fixed resistance value and having a common terminal, an adjustable impedance electrically connected between the other terminals of said pair of resistors, a third resistor of fixed resistance value and a direct current meter of the moving-coil galvanometer type electrically connected in series one with the other and with said adjustable impedance to form with said adjustable impedance a damping circuit for said meter, the ratio of the internal resistance of said meter to the resistance of the one of said pair of resistors directly connected thereto being fixed and equal to the ratio of resistance of said third resistor to the resistance of the other of said pair of resistors to provide a desired value of damping of said meter responsive to adjustment of said adjustable impedance without affecting the calibration of an electrical measuring circuit in which the meter is connected.

2. In combination, a first impedance means and a first resistance means of fixed resistance value, one end of said first impedance means being electrically connected to one end of said first resistance means of fixed resistance value and, a second resistance means having one end connected to said one end of said first impedance means, a third resistance means of fixed resistance value and having one end connected to the other end of said second resistance means, a direct current meter of the moving-coil galvanometer type electrically connected between the other ends of said first and third resistance means thereby forming with said first impedance means and said three resistance means an electrical measuring circuit, the value of said impedance and resistance means being selected and fixed with respect to the internal impedance of said meter to provide a predetermined calibrated value of impedance in said electrical measuring circuit, an adjustable impedance means electrically connected between said other ends of said first and second resistance means to provide an adjustable damping circuit for said meter, said damping circuit comprising said adjustable impedance means said third resistance means and said meter, the ratio of resistance of said first resistance means to the internal resistance of said meter being fixed and equal to the ratio of resistance of said second resistance means to said third resistance means to provide a desired value of damping of said meter responsive to adjustment of said adjustable impedance without affecting the calibrated value of said electrical measuring circuit.

JOHN E. BIGELOW.

REFERENCES CITED

The following references are of record in the file of this patent:

UNITED STATES PATENTS

| Number | Name | Date |
| --- | --- | --- |
| 2,414,499 | Webber | Jan. 21, 1947 |
| 2,463,436 | Sorvaag | Mar. 1, 1949 |